(12) United States Patent
Shimokawa

(10) Patent No.: US 9,630,489 B2
(45) Date of Patent: Apr. 25, 2017

(54) FUEL TANK SYSTEM

(71) Applicant: TOYOTA JIDOSHA KABUSHIKI KAISHA, Toyota-shi, Aichi-ken (JP)

(72) Inventor: Shinji Shimokawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 14/939,596

(22) Filed: Nov. 12, 2015

(65) Prior Publication Data
US 2016/0137055 A1 May 19, 2016

(30) Foreign Application Priority Data
Nov. 18, 2014 (JP) .................. 2014-233909

(51) Int. Cl.
*F02M 33/02* (2006.01)
*B60K 15/035* (2006.01)
*F02M 25/08* (2006.01)

(52) U.S. Cl.
CPC ..... *B60K 15/03504* (2013.01); *F02M 25/089* (2013.01); *F02M 25/0854* (2013.01); *B60K 15/03519* (2013.01); *B60K 2015/03509* (2013.01); *B60K 2015/03514* (2013.01); *B60K 2015/03566* (2013.01); *B60K 2015/03585* (2013.01)

(58) Field of Classification Search
CPC ........ B60K 15/03504; B60K 15/03519; B60K 2015/03514; B60K 2015/03509; B60K 2015/03566; B60K 2015/03585; F02M 25/0854; F02M 25/089; F02M 25/0836
USPC .......................... 123/516, 518, 519, 520, 459
See application file for complete search history.

(56) References Cited

U.S. PATENT DOCUMENTS

2014/0137964 A1* 5/2014 Aso .................... F02M 25/0836
137/587

FOREIGN PATENT DOCUMENTS

| JP | 2013-117181 A | 6/2013 |
|---|---|---|
| JP | 2013-173406 A | 9/2013 |

\* cited by examiner

*Primary Examiner* — Hai Huynh
(74) *Attorney, Agent, or Firm* — Oliff PLC

(57) ABSTRACT

A valve member is provided to a vent pipe for communicating a fuel tank with a canister. A solenoid valve is provided to a canister side bypass passage between a back pressure chamber of the valve member and the canister side vent pipe. An extending member is provided to restrict the valve lift amount in accordance with the internal pressure of the fuel tank.

3 Claims, 6 Drawing Sheets

FUEL TANK SYSTEM

CROSS-REFERENCE TO RELATED APPLICATION

This application claims priority under 35 USC 119 from Japanese Patent Application No. 2014-233909 filed on Nov. 18, 2014, the disclosure of which is incorporated by reference herein.

BACKGROUND

Technical Field

The present invention relates to a fuel tank system.

Related Art

Fuel tank systems with a valve member (diaphragm valve) provided in a vent pipe for transporting gas inside a fuel tank to a canister are known (see, for example, Japanese Patent Application Laid-Open (JP-A) No. 2013-117181). In such fuel tank systems, ordinarily a valve member is placed in a closed state by causing the internal pressure of the tank to act on a back pressure chamber of a valve member, and hermetically close the fuel tank. When necessary, the valve member is placed in an open state by opening the back pressure chamber of the valve member to the atmosphere, and gas inside the fuel tank is transported to the canister. Moreover, in such a fuel tank system, a full tank limit valve provided with a float that floats on the liquid fuel inside the fuel tank is provided at an end portion of the vent pipe on the fuel tank side.

In such a fuel tank system, gas flows vigorously from the fuel tank and into the vent pipe when the back pressure chamber of the valve member is opened to the atmosphere and the valve member is opened in a state of excessively high tank internal pressure inside the fuel tank. The flow of gas acts on the float of the full tank limit valve, and there is a risk that the full tank limit valve might be closed. If the full tank limit valve is closed then gas inside the fuel tank cannot be transported to the canister side, meaning that fueling and pressure release cannot be performed.

SUMMARY OF THE INVENTION

In consideration of the above circumstances, the present invention addresses the issue of obtaining a fuel tank system capable of preventing or suppressing a full tank limit valve from closing when a valve member, provided in a vent pipe for transporting gas from inside a fuel tank to a canister, is opened in a state of high internal pressure of the fuel tank.

A fuel tank system according to a first aspect of the present invention includes: a fuel tank configured to internally store fuel; a canister that employs an adsorbent to adsorb or desorb vaporized fuel produced inside the fuel tank; a full tank limit valve that is provided inside the fuel tank, and that is closed by a float floating on fuel when a liquid surface of fuel inside the fuel tank has reached a pre-set full tank liquid level; an open-to-atmosphere pipe for opening the inside of the canister to the atmosphere; a vent pipe for communicating the fuel tank with the canister via the full tank limit valve and transporting vaporized fuel inside the fuel tank to the canister; a valve member that is provided in the vent pipe, that is partitioned into a tank side main chamber in communication with the vent pipe on the fuel tank side, a canister side main chamber that is in communication with the vent pipe on the canister side, and a back pressure chamber disposed at the opposite side of a valve member body to the tank side main chamber and the canister side main chamber, and that opens to enable communication with the vent pipe as the valve member body moves when the internal pressure of the tank side main chamber and the canister side main chamber becomes higher than the internal pressure of the back pressure chamber; a tank side bypass passage for conducting the internal pressure of the fuel tank to the back pressure chamber; a canister side bypass passage for opening the back pressure chamber to the atmosphere; a solenoid valve that is controlled so as to open or close the canister side bypass passage; and a valve lift amount restricting means that includes an extending member provided in the back pressure chamber so as to be capable of extending, and that restricts a lift amount of the valve member body in accordance with the internal pressure of the fuel tank.

In such a fuel tank system, when the solenoid valve is closed, the back pressure chamber is not opened to the atmosphere, and the tank internal pressure is conducted to the back pressure chamber by the tank side bypass passage. The tank internal pressure is also conducted to the tank side main chamber through the vent pipe on the fuel tank side, and so the internal pressure of the tank side main chamber and the internal pressure of the canister side main chamber do not become so much higher than the internal pressure of the back pressure chamber that the valve member opens, and the fuel tank is hermetically closed.

In this state, when the solenoid valve is opened when the internal pressure of the fuel tank becomes higher than atmospheric pressure, flow through the canister side bypass passage is enabled, and the back pressure chamber is opened to the atmosphere. Namely, internal pressure of the back pressure chamber that has matched the tank internal pressure falls toward atmospheric pressure. However, the tank internal pressure continues to act on the tank side main chamber, and so the internal pressure of the tank side main chamber rises with respect to the internal pressure of the back pressure chamber.

The internal pressure of the main chamber side (the tank side main chamber and the canister side main chamber) becomes higher than the internal pressure of the back pressure chamber, opening the valve member, and enabling communication with the vent pipe. Gas containing vaporized fuel is thereby transported from the high internal pressure fuel tank, through the vent pipe, to the canister.

In the sequence of operation described above, when the tank internal pressure is extremely high when the solenoid valve is opened, gas is liable to flow vigorously into the vent pipe due to the large pressure difference between the tank internal pressure and the atmospheric pressure conducted to the canister. There is accordingly a concern that the rate of gas flow through the full tank limit valve might become excessive, closing the full tank limit valve.

Thus the fuel tank system includes the valve lift amount restricting means. The valve lift amount restricting means is provided with the extending member, and the extending member is provided in the back pressure chamber and is capable of extending. The lift amount of the valve member body is thus restricted according to the tank internal pressure. When the lift amount of the valve member body is restricted, the flow rate of the gas flowing from inside the fuel tank into the vent pipe is suppressed, and closing of the full tank limit valve is prevented or suppressed.

A second aspect of the present invention is the first aspect wherein: the valve lift amount restricting means includes: a tank communication path that is in communication with the fuel tank; and the extending member includes a cylindrical shaped base end cylinder that is in communication with the fuel tank through the tank communication path, and a sliding lid section that is provided so as to be capable of sliding with respect to the base end cylinder, and the extending member extends in accordance with a pressure difference between the internal pressure of the back pressure chamber and the internal pressure of the fuel tank.

The extending member includes the cylindrical shaped base end cylinder, and the base end cylinder is in communication with the fuel tank through the tank communication path. The sliding lid section is provided so as to be capable of sliding with respect to the base end cylinder. The extending member is thereby configured so as to extend according to the pressure difference between the internal pressure of the back pressure chamber in which the extending member is provided and the tank internal pressure that acts on the inside of the base end cylinder. The extension length of the extending member is controlled by causing the tank internal pressure to act on the sliding lid section, enabling control of extension of the extending member to be performed using a simple structure.

A third aspect of the present invention is the first aspect, wherein the valve lift amount restricting means includes: a pressure sensor that measures the internal pressure of the fuel tank; and a control device that controls extension of the extending member in accordance with the tank internal pressure measured by the pressure sensor.

The tank internal pressure is measured by the pressure sensor, and the control device controls extension of the extending member in accordance with the measured tank internal pressure. The lift amount of the valve member body is limited by controlling extension of the extending member provided in the back pressure chamber.

BRIEF DESCRIPTION OF THE DRAWINGS

FIG. 2A is an expanded partial cross-section of a closed state of a solenoid valve and diaphragm valve, and FIG. 2B is an expanded cross-section of an extending member.

FIG. 6A is an expanded partial cross-section of a closed state of a solenoid valve and diaphragm valve, and FIG. 6B is an expanded cross-section of an extending member.

DETAILED DESCRIPTION OF THE INVENTION

Figure 1:
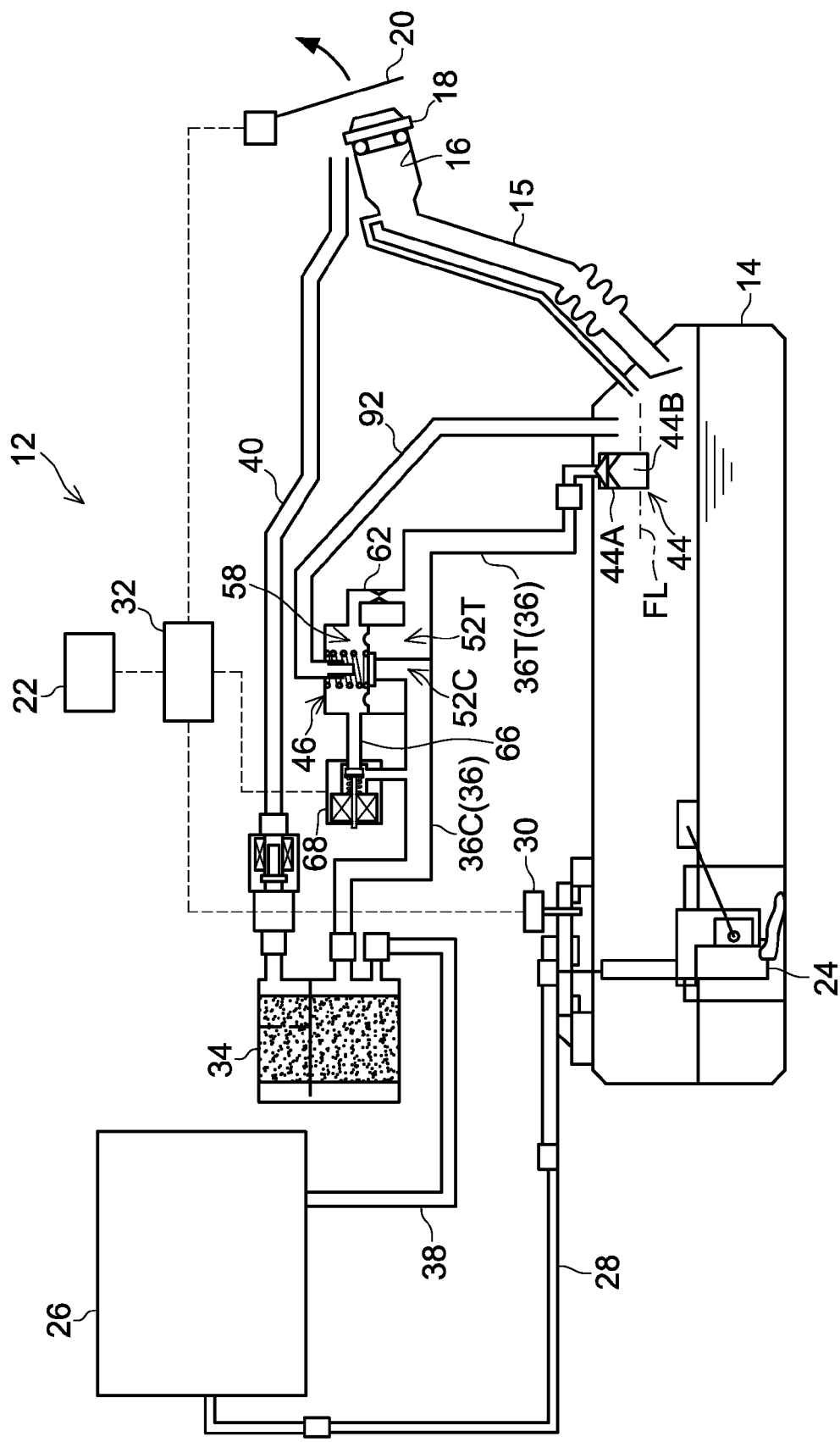
FIG. 1 is a schematic configuration diagram illustrating an overall configuration of a fuel tank system of a first exemplary embodiment.

FIG. 1 illustrates a fuel tank system 12 of a first exemplary embodiment.

The fuel tank system 12 includes a fuel tank 14 capable of internally storing fuel. The upper portion of the fuel tank 14 is connected to a lower portion of an inlet pipe 15. An opening portion at the upper end of the inlet pipe 15 configures a fuel inlet 16. A fuel gun is inserted into the fuel inlet 16, enabling fuel to be supplied into the fuel tank 14. The fuel inlet 16 of the inlet pipe 15 is ordinarily closed off by a fuel cap 18, and the fuel cap 18 is removed by a fueling operator or the like when fueling.

A lid 20 is provided to a panel of the vehicle body, further to the outside than the fuel cap 18. The lid 20 is opened under specific circumstances, described below, by a control device 32 when information from operating a lid open switch 22 provided inside the vehicle cabin, or the like, is transmitted to the control device 32.

A fuel pump 24 is provided inside the fuel tank 14. The fuel pump 24 and an engine 26 are connected together by a fuel supply pipe 28. The fuel inside the fuel tank 14 can be transported to the engine 26 through the fuel supply pipe 28 by driving the fuel pump 24.

A tank internal pressure sensor 30 is provided to the fuel tank 14. Information about the internal pressure inside the fuel tank 14 detected by the tank internal pressure sensor 30 is transmitted to the control device 32.

A canister 34 is provided to an external portion of the fuel tank 14. An adsorbent such as activated carbon is housed in the canister 34. The gaseous layer inside the fuel tank 14 and the inside of the canister 34 are connected together by a vent pipe 36, and gas inside the fuel tank 14 can be caused to flow into the canister 34. Vaporized fuel present in the in-flowing gas is adsorbed by the adsorbent of the canister 34, and other gases (air components) are discharged into the atmosphere through an open-to-atmosphere pipe 40.

A purge pipe 38 in communication with the engine 26 is connected to the canister 34. A negative pressure occurring during operation of the engine 26 acts on the canister 34, enabling separation of the vaporized fuel that was adsorbed by the adsorbent of the canister 34. The separated vaporized fuel is transported to the engine 26 and combusted. Air is introduced into the canister 34 through the open-to-atmosphere pipe 40 when this occurs.

A full tank limit valve 44 is provided at the end portion of the vent pipe 36 on the fuel tank 14 side, so as to be positioned in an upper portion inside the fuel tank 14. The full tank limit valve 44 is what is referred to as a float valve, and includes a float 44B, which floats on the fuel inside a substantially cylindrical shaped valve housing 44A.

Up until the point when the liquid surface of fuel in the fuel tank 14 reaches a full tank liquid level FL (see FIG. 1), the float 44B does not float on the fuel, and the full tank limit valve 44 is open. In this state, air inside the fuel tank 14 is able to be transported to the canister 34 side. When the fuel liquid surface of the fuel tank 14 reaches the full tank liquid level FL, the float 44B adopts a floating state on the fuel, and the full tank limit valve 44 adopts a closed state. Flow through the vent pipe 36 is not possible in this state, and so gas in the fuel tank 14 cannot be transported to the canister 34 side. If fuel is then further supplied into the fuel tank 14, the fuel rises in the inlet pipe 15, and reaches the fuel gun. Fueling is stopped when an auto-stop function of the fuel gun is triggered.

A diaphragm valve 46 is provided to an intermediate portion of the vent pipe 36 (a portion between the fuel tank 14 and the canister 34). The diaphragm valve 46 is an example of a valve member of the present invention. In the following, the vent pipe 36 further to the fuel tank 14 side than the diaphragm valve 46 will be referred to as the tank side vent pipe 36T, and the vent pipe 36 further to the canister 34 side than the diaphragm valve 46 will be referred to as the canister side vent pipe 36C, as required.

Figure 2A:
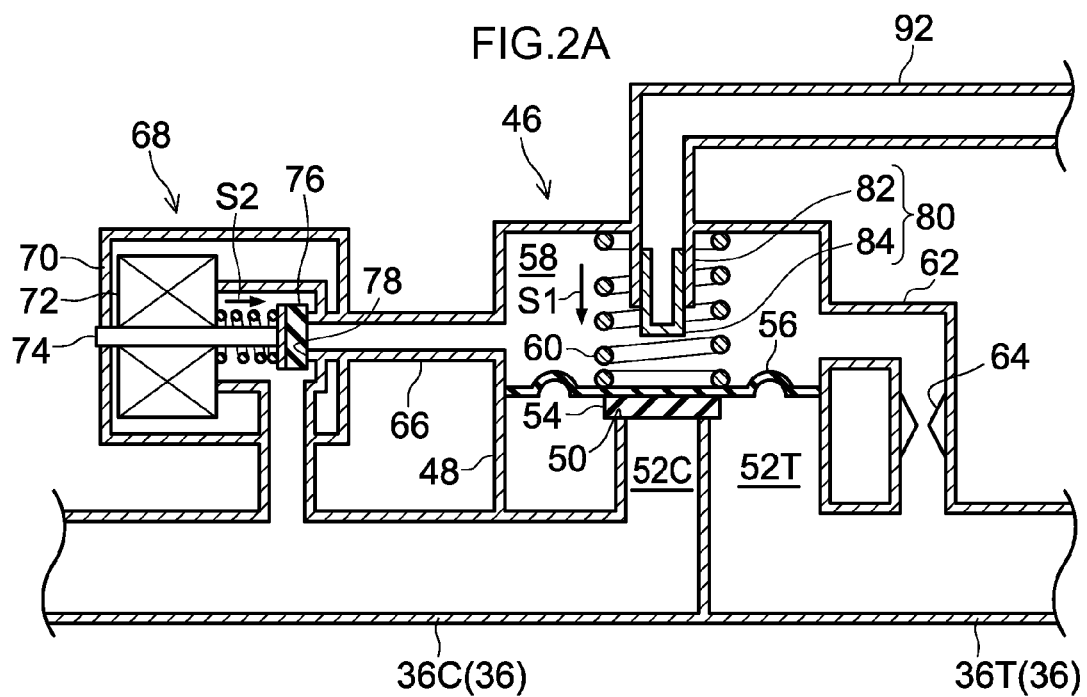
FIGS. 2A and 2B illustrate a fuel tank system of the first exemplary embodiment.

As illustrated in detail in FIG. 2A, the diaphragm valve 46 includes a cylindrical shaped valve housing 48 connected to the tank side vent pipe 36T. One end side of the canister side vent pipe 36C is housed inside the valve housing 48. The housed one end side of the canister side vent pipe 36C is bent so as to be coaxial to the valve housing 48, and this end side configures a valve seat 50.

The opening portion of the valve seat 50 is closable by a valve member body 54. The valve member body 54 is attached to a diaphragm 56, and the inside of the valve housing 48 is partitioned up and down by the diaphragm 56. Inside the valve housing 48, a space further to the upper side than the diaphragm 56 in FIG. 2A configures a back pressure chamber 58. The other space, further to the lower side than the diaphragm 56 in FIG. 2A, configures a main chamber 52. The portion of the main chamber 52 corresponding to the one end side of the canister side vent pipe 36C configures a canister side main chamber 52C, and other portion of the main chamber 52 configures a tank side main chamber 52T.

A compression coil spring 60 is housed inside the back pressure chamber 58. The compression coil spring 60 causes a spring force to act on the valve member body 54 in a direction toward the valve seat 50 (arrow S1 direction). Due to its own elasticity, the diaphragm 56 also causes a spring force to act on the valve member body 54 in the arrow S1 direction. The valve member body 54 is accordingly biased in the direction closing off the opening portion of the valve seat 50. For example, when the internal pressure of the tank side main chamber 52T and the internal pressure of the back pressure chamber 58 are similar levels to each other, the valve member body 54 makes close contact with the valve seat 50. The opening portion of the valve seat 50 is thereby closed off, and movement (flow) of gas between the tank side main chamber 52T and the canister side main chamber 52C is prevented. Namely, the diaphragm valve 46 adopts a closed state, and movement of gas in the vent pipe 36 is prevented.

In contrast thereto, when, for example, the back pressure chamber 58 is at a greater negative pressure (a lower internal pressure state) than the main chamber 52 by a specific value or greater, the valve member body 54 moves, against the spring force of the compression coil spring 60 and the diaphragm 56, toward the back pressure chamber 58 side, and the opening portion of the valve seat 50 is opened. This accordingly enables the movement (flow) of gas between the tank side main chamber 52T and the canister side main chamber 52C. Namely, the diaphragm valve 46 adopts an open state, and movement of gas in the vent pipe 36 is enabled.

In the operation explained above, it is presumed that atmospheric pressure acts on the canister side main chamber 52C via the canister 34 and the open-to-atmosphere pipe 40.

A tank side bypass passage 62 is provided between the tank side vent pipe 36T and the back pressure chamber 58. Gas is able to move between the fuel tank 14 and the back pressure chamber 58 through the tank side bypass passage 62.

A constricted portion 64 with a locally smaller internal diameter is provided within the tank side bypass passage 62. A specific resistance to the movement of gas between the fuel tank 14 and the back pressure chamber 58 is generated by the constricted portion 64.

There is, however, no limitation to a configuration in which there is a locally reduced diameter of the tank side bypass passage 62 as a means for causing resistance to the movement of gas between the fuel tank 14 and the back pressure chamber 58. For example, the internal diameter of the tank side bypass passage 62 may be made smaller overall, so as to generate resistance to the movement of gas. Moreover, the tank side bypass passage 62 may be bent (bent or curved) so as to generate resistance to the movement of gas.

A canister side bypass passage 66 is provided between the canister side vent pipe 36C and the back pressure chamber 58. A solenoid valve 68 is provided at an intermediate portion of the canister side bypass passage 66.

The solenoid valve 68 includes a solenoid valve housing 70. Inside the solenoid valve housing 70 there are a coil section 72 that is electrically controlled by the control device 32, a plunger portion 74 that bears driving force from the coil section 72 and moves in the arrow S2 direction or the opposite direction, and a disk shaped solenoid valve body 76 provided at a leading end of the plunger portion 74. Moreover, a portion (an intermediate portion) of the canister side bypass passage 66 passes though into the solenoid valve housing 70.

Figure 3:
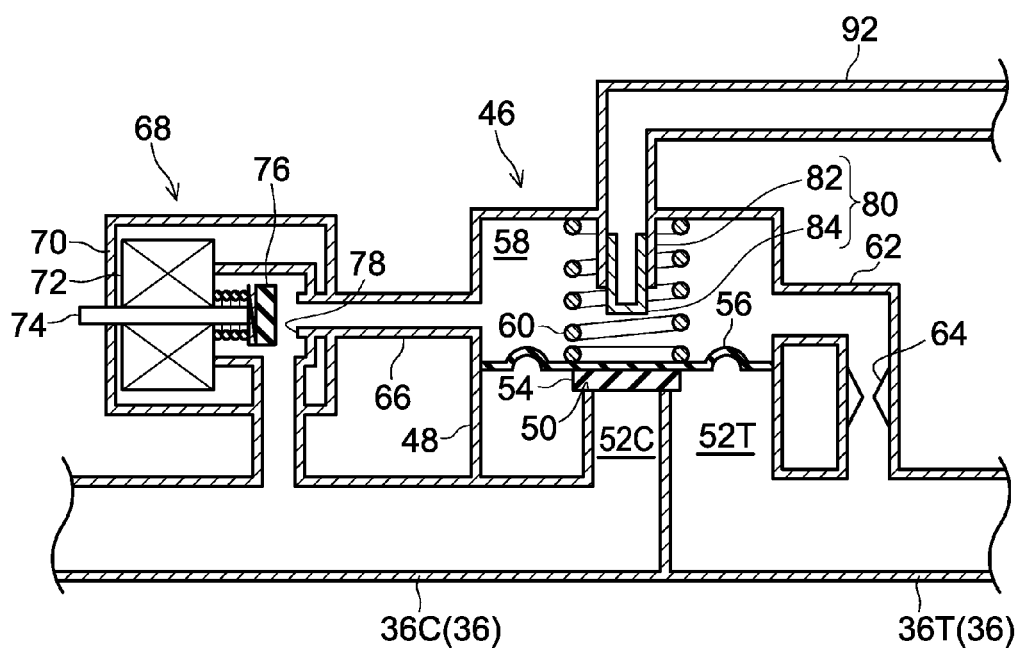
FIG. 3 is a cross-section illustrating a fuel tank system of the first exemplary embodiment immediately after opening a solenoid valve.

As illustrated in FIG. 2A, the solenoid valve body 76 closes off the canister side bypass passage 66 in a state in which the solenoid valve body 76 is in contact with a valve seat 78 provided to the canister side bypass passage 66. In contrast thereto, as illustrated in FIG. 3, when the solenoid valve body 76 separates from the valve seat 78, gasses are able to move through the canister side bypass passage 66.

An extending member 80 is provided in the back pressure chamber 58 so as to project out from the internal wall of the back pressure chamber 58. The extending member 80 includes a base end cylinder 82 formed in a hollow cylindrical shape, and a sliding lid section 84 capable of sliding with respect to the base end cylinder 82. The sliding lid section 84 is configured in a state in which a portion of the sliding lid section 84 is inserted through an opening in the leading end side of the base end cylinder 82, and the opening of the base end cylinder 82 is thereby closed off by the sliding lid section 84.

Figure 2B:
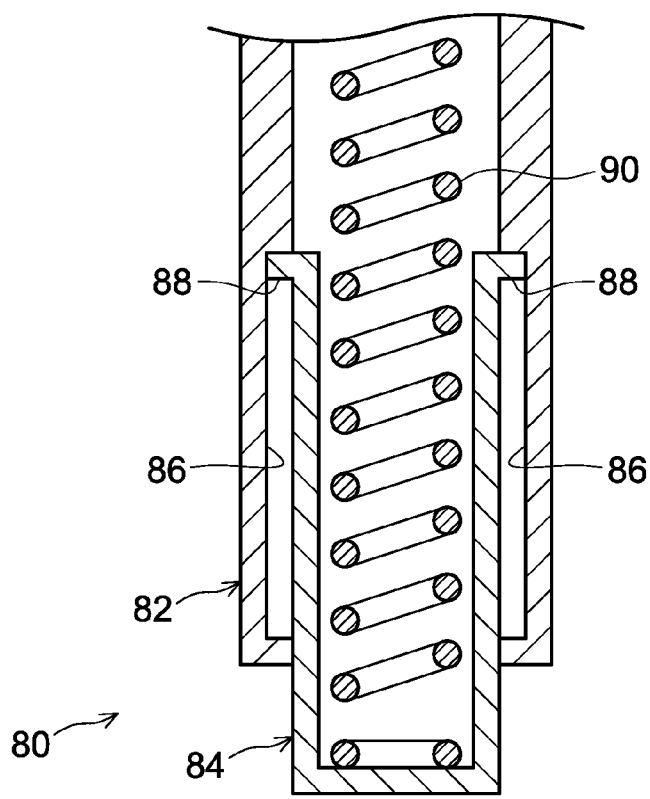

As illustrated in detail in FIG. 2B, a guide groove 86 is formed, parallel to the axial direction of the base end cylinder 82, in the internal face of the base end cylinder 82. In fact there are plural of the guide grooves 86 formed (two in the present exemplary embodiment). Engagement projections 88 are formed to the sliding lid section 84 so as to correspond to the guide grooves 86 formed in the internal face of the base end cylinder 82. The sliding lid section 84 is accordingly capable of sliding over a specific sliding range with respect to the base end cylinder 82.

A coil spring 90 is provided inside the extending member 80, namely inside the base end cylinder 82 and the sliding lid section 84. One end side of the coil spring 90 is attached to the sliding lid section 84, and the other end side is attached to a support section (not illustrated in the drawings) provided to the base end cylinder 82. The sliding lid section 84 is resiliently supported with respect to the base end cylinder 82 through the coil spring 90.

As illustrated in FIG. 1 and FIG. 2A, the inside of the base end cylinder 82 is in communication with the gaseous layer inside the fuel tank 14 through a tank communication path 92.

In such a configuration, the tank internal pressure acts on the sliding lid section 84 from the inside of the extending member 80, and the internal pressure of the back pressure chamber 58 acts on the sliding lid section 84 from the outside of the extending member 80. Thus the extending member 80 extends or retracts according to the pressure difference between the tank internal pressure and the internal pressure of the back pressure chamber 58.

The natural length, the spring constant, and the like of the coil spring 90 are, for example, set such that the engagement projections 88 of the sliding lid section 84 are positioned in the vicinity of the upper end of the guide groove 86 when the tank internal pressure and the internal pressure of the back pressure chamber 58 are at a similar level. However when the internal pressure of the back pressure chamber 58 becomes lower than the tank internal pressure, the pressure from the inside of the extending member 80 becomes the larger out of the pressures acting on the sliding lid section 84, and the sliding lid section 84 slides toward the extending member 80 outside. As a result, the extending member 80 extends toward the diaphragm 56. Namely, the extension length of the extending member 80 is longer the higher the tank internal pressure is relative to the internal pressure of the back pressure chamber 58. Setting is made such that in a state in which the extending member 80 is extended by a specific value or greater, the extending member 80 abuts the diaphragm 56 when the diaphragm valve 46 is open, or being opened.

In the first exemplary embodiment as described above, the lift amount of the valve member body of the diaphragm valve 46 is restricted by the tank communication path 92 and the extending member 80 in accordance with the internal pressure of the fuel tank 14 (an example of a "valve lift amount restricting means" of the present invention).

Explanation next follows regarding operation of the fuel tank system 12 of the present exemplary embodiment.

In the fuel tank system 12 of the present exemplary embodiment, in an ordinary state, namely a state in which the fuel tank 14 is not being fueled (a traveling or parked state of the vehicle), the solenoid valve body 76 of the solenoid valve 68 is closed, as illustrated in FIG. 2A. The valve member body 54 of the diaphragm valve 46 is also closed. The internal pressure of the fuel tank 14 accordingly acts in both the tank side main chamber 52T and the back pressure chamber 58 of the diaphragm valve 46. The diaphragm valve 46 is maintained in the closed state by the spring force of the compression coil spring 60 and the diaphragm 56, and is not unintentionally opened.

When a lid open switch 22 is operated, the control device 32 first opens the solenoid valve 68, as illustrated in FIG. 3. The back pressure chamber 58 of the diaphragm valve 46 is accordingly open to the atmosphere via the open-to-atmosphere pipe 40, the canister 34, and then the canister side vent pipe 36C and the canister side bypass passage 66. Namely, the internal pressure of the back pressure chamber 58 lowers to approach that of the atmosphere.

The tank side main chamber 52T is open to the atmosphere via the back pressure chamber 58, and also via the tank side bypass passage 62 and the tank side vent pipe 36T. However, in the present exemplary embodiment, a specific resistance to movement of gasses between the tank side main chamber 52T and the back pressure chamber 58 arises due to provision of the constricted portion 64 in the tank side bypass passage 62, and so it accordingly takes longer for the internal pressure of the tank side main chamber 52T to reach a similar level to that of the back pressure chamber 58 than the back pressure chamber 58. Namely, this leads to a state in which a pressure difference occurs between the back pressure chamber 58 and the tank side main chamber 52T (the back pressure chamber 58 is in a lower internal pressure state than the tank side main chamber 52T).

Figure 4:
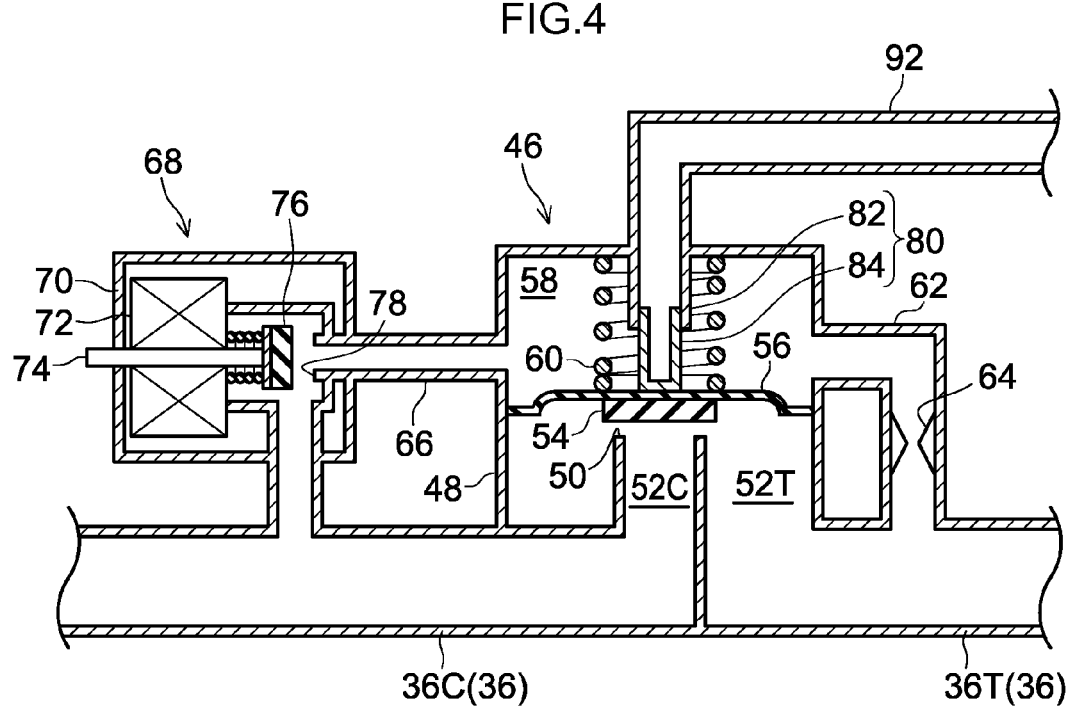
FIG. 4 is a cross-section illustrating a fuel tank system of the first exemplary embodiment in an open state of a diaphragm valve after a solenoid valve has been opened.

Thus when the internal pressure of the tank side main chamber 52T is relatively higher than the internal pressure of the back pressure chamber 58, and that pressure difference reaches a specific value (a diaphragm valve opening pressure), the valve member body 54 moves toward the back pressure chamber 58 side (upper side), and the diaphragm valve 46 opens, as illustrated in FIG. 4. The gasses inside the fuel tank 14 are thereby able to move to the canister 34.

Then the control device 32 opens the lid 20 when a state in which the internal pressure of the fuel tank 14 has fallen to less than the specific value is detected, by the tank internal pressure sensor 30. When the lid 20 has been opened, the fueling operator is able to remove the fuel cap 18 from the fuel inlet 16 and perform fueling.

Consider first, as a comparative example, a fuel tank system that is not provided with the valve lift amount restricting means (the tank communication path 92 and the extending member 80) (but that otherwise has a configuration substantially the same as that of the first exemplary embodiment).

In the fuel tank system of the comparative example, when the internal pressure of the fuel tank is excessively high when the solenoid valve is opened, a large volume of gas attempts to move from the full tank limit valve toward the vent pipe due to the large pressure difference between the tank internal pressure and the atmospheric pressure acting on the canister 34. There is a concern that the float moves in the valve closing direction (upward direction) pushed by the gas, and closes the full tank limit valve. If the full tank limit valve is closed, then the internal pressure inside the fuel tank cannot be lowered, and so the lid is not able to be opened by the control device, giving rise to a state in which fueling is not possible.

In contrast thereto, in the fuel tank system 12 of the present exemplary embodiment, the extending member 80 is extended until the pressure difference between the internal pressure of the tank side main chamber 52T and the internal pressure of the back pressure chamber 58 reaches a specific value (the diaphragm valve opening pressure).

Namely, in the state prior to the solenoid valve 68 opening, the extending member 80 is not extended since the tank internal pressure and the internal pressure of the back pressure chamber 58 are at similar levels to each other. However, when the solenoid valve 68 is opened, the internal pressure of the back pressure chamber 58 lowers toward atmospheric pressure. Thus due to the pressure difference between the tank internal pressure and the internal pressure of the back pressure chamber 58 becoming larger, the extending member 80 extends accordingly. The diaphragm valve 46, however, does not open until the pressure difference between the internal pressure of the tank side main chamber 52T and the internal pressure of the back pressure chamber 58 is a specific value (the diaphragm valve opening pressure), and first opens when the specific value (the diaphragm valve opening pressure) is reached.

Namely, the extending member 80 extends before the diaphragm valve 46 opens, and the leading end portion of the extending member 80 (the leading end portion of the sliding lid section 84) abuts the diaphragm 56, and restricts the lift amount of the valve member body 54.

In particular, the higher the tank internal pressure, the more the extending member 80 extends and the smaller the lift amount of the valve member body 54, such that closing of the full tank limit valve 44 is effectively suppressed.

Figure 5:
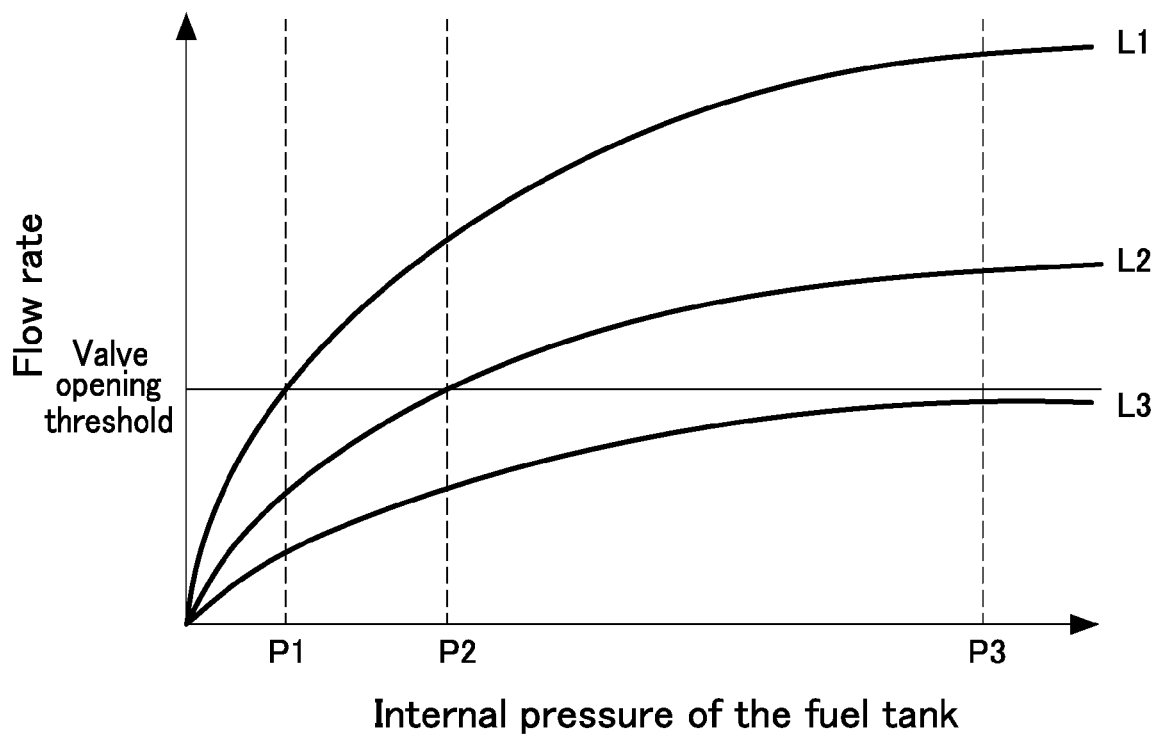
FIG. 5 is a graph illustrating a relationship between tank internal pressure and gas flow rate flowing in the vent pipe in the first exemplary embodiment.

FIG. 5 illustrates the relationship between the internal pressure of the fuel tank 14 and the flow rate of gas flowing in the vent pipe 36 from the fuel tank 14 toward the canister 34 side (the flow volume per unit time), for each valve lift amount of the diaphragm valve 46. Curve L1 in FIG. 5 illustrates the relationship between tank internal pressure and the flow rate at maximum valve lift amount, curve L3 illustrates the relationship between the tank internal pressure and the flow rate at minimum valve lift amount (when the extending member 80 is extended to the maximum extent and abuts the diaphragm 56). The curve L2 illustrates the relationship between the tank internal pressure and the flow rate at an intermediate level of valve lift amount.

In this graph, a "valve opening threshold" is a flow rate such that the full tank limit valve 44 is open when the flow rate of gas flowing in the vent pipe 36 is less than the valve opening threshold, but there is a concern that the full tank limit valve 44 might close when the flow rate exceeds the valve opening threshold.

It is apparent from the graph that the flow rate is greater the higher the tank internal pressure. Moreover, the flow rate is also greater the larger the valve lift amount of the diaphragm valve 46.

In the fuel tank system of the comparative example, when the solenoid valve 68 is opened when in a state of extremely high tank internal pressure (for example, at P3 in FIG. 5), the diaphragm valve 46 is opened to the maximum extent due to the pressure difference becoming large between the tank side main chamber 52T (where the tank internal pressure acts) and the back pressure chamber 58 (lowering toward atmospheric pressure). Thus the relationship between the tank internal pressure and the flow rate is the relationship illustrated by curve L1 in FIG. 5. The flow rate at this time when the tank internal pressure is extremely high (P3) exceeds the "valve opening threshold", as illustrated by the curve L1, and so there is a high likelihood that the full tank limit valve 44 closes.

In contrast thereto, in the fuel tank system 12 of the present exemplary embodiment, the extending member 80 is provided, and the extending member 80 extends longer the higher the tank internal pressure, restricting the lift amount of the diaphragm valve 46. Thus when the solenoid valve 68 is opened in a state of extremely high tank internal pressure (for example, P3 in FIG. 5), although the diaphragm valve 46 is open to the maximum extent, the extending member 80 extends before the diaphragm valve 46 opens. When this occurs, the extending member 80 extends by the maximum extent since the tank internal pressure is extremely high. There is, as a result, only a minimal valve lift amount of the diaphragm valve, and the relationship between the tank internal pressure and the flow rate is the relationship illustrated by the curve L3 in FIG. 5. The flow rate on the curve L3 when the tank internal pressure is extremely high (P3), does not reach the "valve opening threshold" and so there is no concern that the full tank limit valve 44 might close.

When the tank internal pressure is in a comparatively low state (for example, P1 in FIG. 5), the flow rate does not exceed the "valve opening threshold" even if the diaphragm valve 46 is opened to the maximum extent, as illustrated by curve L1 in FIG. 5. Namely, there is no concern that the full tank limit valve 44 might shut, irrespective of the valve lift amount. Rather, it is beneficial for the valve lift amount of the diaphragm valve 46 not to be restricted, in order to lower the tank internal pressure to the specific value quickly (in order to quickly enable fueling). With regards to this point, in the fuel tank system 12 of the present exemplary embodiment, in cases in which the solenoid valve has opened in a state in which the tank internal pressure is comparatively low (for example, P1 in FIG. 5), the extension length of the extending member 80 is comparatively shorter than in cases in which the tank internal pressure is high, since the pressure difference is small between the tank internal pressure and the internal pressure of the back pressure chamber. Thus the extending member 80 does not restrict the valve lift amount, and so is not an impediment to quickly lowering the tank internal pressure.

Moreover, at an intermediate state of tank internal pressure (P2 in FIG. 5), although, as illustrated in FIG. 5, the flow rate at the maximum extent of valve lift amount exceeds the "valve opening threshold" (curve L1), the "valve opening threshold" is not exceeded when the valve lift amount is an intermediate extent or lower (curves L2, L3). With regards to this point, in the fuel tank system 12 of the present exemplary embodiment, in cases in which the solenoid valve has opened when the tank internal pressure is in an intermediate state, the extension length of the extending member 80 is also at an intermediate extent. The relationship between the tank internal pressure and the flow rate is therefore the relationship of curve L2, closing of the full tank limit valve 44 is suppressed or prevented, such that the time until the tank internal pressure is lowered to the specific value is not extended unnecessarily.

Figure 6A:
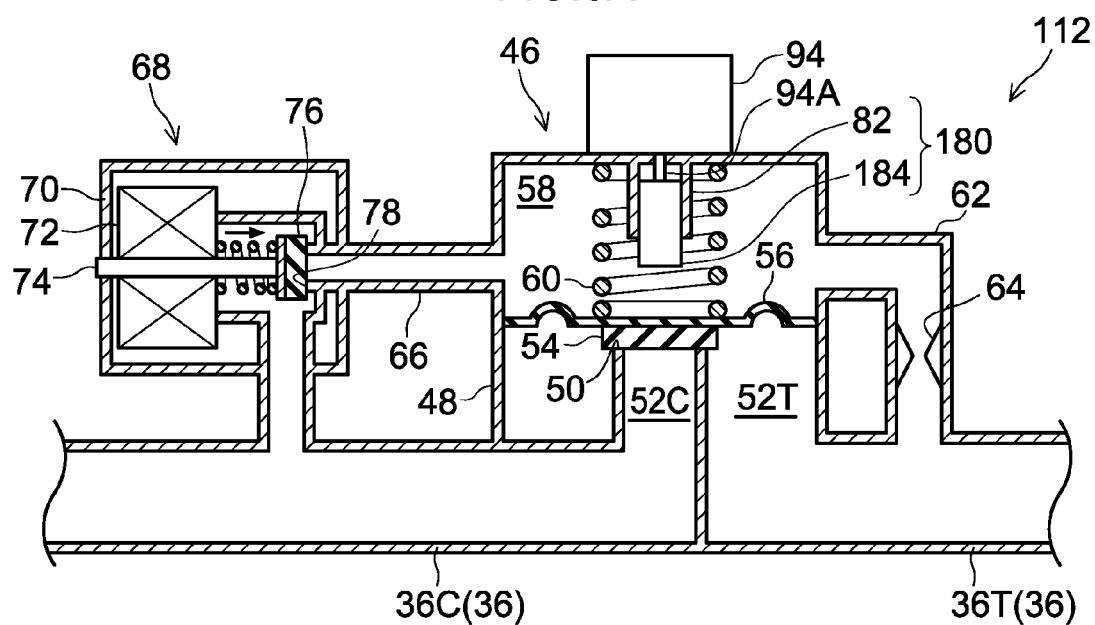
FIGS. 6A and 6B illustrate a fuel tank system of a second exemplary embodiment.
Figure 6B:
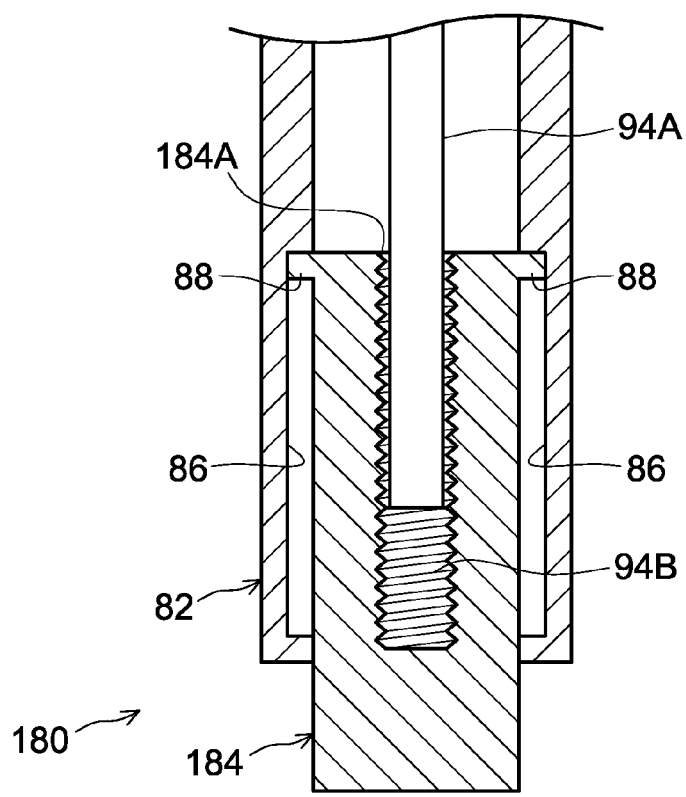

FIG. 6A and FIG. 6B illustrate an expanded portion of a fuel tank system 112 of a second exemplary embodiment of the present invention. The second exemplary embodiment differs from the first exemplary embodiment in the extending member and peripheral structure thereto (a different configuration of valve lift amount restricting means).

The fuel tank system 112 of the second exemplary embodiment is not equipped with a tank communication path 92 (see FIG. 1), and instead is equipped with a motor 94. A male thread 94B is formed to the leading end portion of the motor shaft 94A. A female thread 184A is formed to a sliding lid 184 of an extending member 180 provided coaxially to the motor shaft 94A. The male thread 94B is screwed into the female thread 184A. The extension length of the extending member 180 of the second exemplary embodiment is adjusted by driving the motor 94 in this state.

The motor 94 is controlled by the control device 32. More specifically, information about the tank internal pressure measured by a tank internal pressure sensor 30 is transmitted to the control device 32, and the control device 32 controls the motor 94 based on the information about the tank internal pressure. The extension length of the extending member 180 is accordingly controlled by the control device 32.

As described above, in the second exemplary embodiment, the valve lift amount restricting means includes the extending member 180, the tank internal pressure sensor 30, and the control device 32. Excepting this, the fuel tank system 112 of the second exemplary embodiment has substantially the same configuration as the fuel tank system 12 of the first exemplary embodiment.

In the fuel tank system 112 of the second exemplary embodiment configured in this manner, the internal pressure of the fuel tank 14 can be made to act on both the tank side main chamber 52T and the back pressure chamber 58 of the diaphragm valve 46 by closing the solenoid valve 68. In this manner the internal pressure of the tank side main chamber 52T and the back pressure chamber 58 can be made a similar level to each other, and the fuel tank 14 can be hermetically closed by placing the diaphragm valve 46 in a closed state.

When the lid open switch 22 is pressed by a fueling operative or the like during fueling of the fuel tank 14, the control device 32 places the solenoid valve 68 in an open state. Thus the back pressure chamber 58 of the diaphragm valve 46 is open to the atmosphere, the diaphragm valve 46 is open, and the gas within the fuel tank 14 is able to move to the canister 34.

When this occurs, for example, when in a state of extremely high tank internal pressure (P3 of FIG. 5), the control device 32 extends the extending member 180 to the maximum limit. The valve lift amount of the diaphragm valve 46 is minimized by extending the extending member 180 to the maximum limit, and the relationship between tank internal pressure and flow rate is the relationship of curve L3 of FIG. 5. As illustrated by curve L3, when the state of tank internal pressure is that of P3, the flow rate does not exceed the "open valve threshold", and so there is no concern that the full tank limit valve 44 might close.

In, for example, a comparatively low tank internal pressure state (P1 of FIG. 5), the control device 32 does not extend the extending member 180. The valve lift amount of the diaphragm valve 46 is not limited due to the extending member 180 not being extended. When the tank internal pressure is P1, since there is no concern that the full tank limit valve 44 might close irrespective of the valve lift amount of the diaphragm valve 46, the time until the tank internal pressure is lowered to a specific value is not unnecessarily lengthened due to not restricting the valve lift amount of the diaphragm valve 46 in this manner.

Moreover, when, for example, the tank internal pressure is in an intermediate state (P2 of FIG. 5), the control device 32 extends the extending member 180 to an intermediate extent. The valve lift amount of the diaphragm valve 46 is also restricted to an intermediate extent by extending the extending member 180 to an intermediate extent, and the relationship between tank internal pressure and flow rate is the relationship of curve L2 in FIG. 5. As illustrated by curve L2, the flow rate substantially matches the "valve opening threshold" when the tank internal pressure is at P2. The full tank limit valve 44 is accordingly prevented from closing, and the time until the tank internal pressure is lowered to a specific value is not unnecessarily lengthened.

Examples have given in each of the exemplary embodiments described above in which the solenoid valve 68 is opened before fueling, and the tank internal pressure is lowered to the specific value. However, the diaphragm valve 46 may be opened ("pressure release" may be performed) by the control device 32 opening the solenoid valve 68 even outside of fueling when the tank internal pressure exceeds a specific pressure.

Examples have been given in each of the exemplary embodiments described above in which the sliding lid section 84, 184 slides inside the base end cylinder 82. However, configuration may be made such that the sliding lid section slides on the outside of a base end cylinder.

Examples have been given above in the second exemplary embodiment in which the extending member 180 is extended under driving force of the motor 94. However, the extending member 180 of the second exemplary embodiment is not limited thereto, and any configuration may be adopted as long as extension is controllable by the control device 32.

Moreover, there is no particular limitation to the timing for controlling extension of the extending member 180 in the second exemplary embodiment, and any timing may be adopted that is capable of restricting the valve lift amount during opening of the diaphragm valve 46. For example, the tank internal pressure measured by the tank internal pressure sensor 30 may be constantly monitored and extension controlled according to the tank internal pressure, or extension may be controlled only at times when opening of the solenoid valve 68 is controlled.

Moreover, examples have been given above in each of the exemplary embodiments in which the diaphragm valve 46 is configured by the valve housing 48 of larger diameter than the tank side vent pipe 36T, and the canister side vent pipe 36C is housed inside the valve housing 48, with the end portion of the canister side vent pipe 36C configuring the valve seat 50. However, the diaphragm valve 46 is not limited thereto, and the configuration of the canister side vent pipe 36C and the tank side vent pipe 36T may be reversed.

Examples have been given above in which the diaphragm valve 46 serves as a valve member, however, the valve member is not limited to the diaphragm valve 46. For example, configuration may be made without the diaphragm 56, with the outer circumference of the valve member body 54 given an enlarged diameter so as to make contact with the inner circumference of the valve housing 48. In such a configuration, the valve member body 54 alone partitions the main chamber 52 from the back pressure chamber 58, and moves between a position closing off the vent pipe 36 by contact with the valve seat 50, and a position opening the vent pipe 36 by separating from the valve seat 50.

What is claimed is:

1. A fuel tank system, comprising:
   a fuel tank configured to internally store fuel;
   a canister that employs an adsorbent to adsorb or desorb vaporized fuel produced inside the fuel tank;
   a full tank limit valve that is provided inside the fuel tank, and that is closed by a float floating on fuel when a liquid surface of fuel inside the fuel tank has reached a pre-set full tank liquid level;
   an open-to-atmosphere pipe for opening the inside of the canister to the atmosphere;
   a vent pipe for communicating the fuel tank with the canister via the full tank limit valve and transporting vaporized fuel inside the fuel tank to the canister;
   a valve member that is provided in the vent pipe, that is partitioned into a tank side main chamber in communication with the vent pipe on the fuel tank side, a canister side main chamber that is in communication with the vent pipe on the canister side, and a back pressure chamber disposed at the opposite side of a valve member body to the tank side main chamber and the canister side main chamber, and that opens to enable communication with the vent pipe as the valve member body moves when the internal pressure of the tank side main chamber and the canister side main chamber becomes higher than the internal pressure of the back pressure chamber;
   a tank side bypass passage for conducting the internal pressure of the fuel tank to the back pressure chamber;
   a canister side bypass passage for opening the back pressure chamber to the atmosphere;
   a solenoid valve that is controlled so as to open or close the canister side bypass passage; and
   a valve lift amount restricting means that includes an extending member provided in the back pressure chamber so as to be capable of extending, and that restricts a lift amount of the valve member body in accordance with the internal pressure of the fuel tank.

2. The fuel tank system of claim 1, wherein:
   the valve lift amount restricting means includes a tank communication path that is in communication with the fuel tank; and
   the extending member includes a cylindrical shaped base end cylinder that is in communication with the fuel tank through the tank communication path, and a sliding lid section that is provided so as to be capable of sliding with respect to the base end cylinder, and the extending member extends in accordance with a pressure difference between the internal pressure of the back pressure chamber and the internal pressure of the fuel tank.

3. The fuel tank system of claim 1, wherein the valve lift amount restricting means includes:
   a pressure sensor that measures the internal pressure of the fuel tank; and
   a control device that controls extension of the extending member in accordance with the tank internal pressure measured by the pressure sensor.

\* \* \* \* \*